US012479532B2

(12) United States Patent
Küschall

(10) Patent No.: US 12,479,532 B2
(45) Date of Patent: Nov. 25, 2025

(54) CLAMPING DEVICE

(71) Applicant: Rainer Küschall, Allschwil (CH)

(72) Inventor: Rainer Küschall, Allschwil (CH)

(73) Assignee: Rainer Küschall, Allschwil (CH)

( * ) Notice: Subject to any disclaimer, the term of this patent is extended or adjusted under 35 U.S.C. 154(b) by 493 days.

(21) Appl. No.: 18/003,224

(22) PCT Filed: Jun. 30, 2021

(86) PCT No.: PCT/EP2021/067989
§ 371 (c)(1),
(2) Date: Dec. 23, 2022

(87) PCT Pub. No.: WO2022/003019
PCT Pub. Date: Jan. 6, 2022

(65) Prior Publication Data

US 2023/0257057 A1 Aug. 17, 2023

(30) Foreign Application Priority Data

Jun. 30, 2020 (CH) .................................... 00808/20

(51) Int. Cl.
*B62K 13/04* (2006.01)
*B62K 5/025* (2013.01)
*A61G 5/04* (2013.01)

(52) U.S. Cl.
CPC .............. *B62K 13/04* (2013.01); *B62K 5/025* (2013.01); *A61G 5/04* (2013.01); *A61G 2203/78* (2013.01)

(58) Field of Classification Search
CPC ...... A61G 5/04; A61G 5/047; A61G 2203/78; A61G 2203/80; B62K 5/025; B62K 13/04
USPC ............................................... 280/250.1, 282
See application file for complete search history.

(56) References Cited

FOREIGN PATENT DOCUMENTS

| | | | | |
|---|---|---|---|---|
| DE | 19829128 | A1 * | 9/1999 | ............. A61G 5/023 |
| WO | 2015040507 | A2 | 3/2015 | |
| WO | 2017081475 | A1 | 5/2017 | |
| WO | 2019057799 | A1 | 3/2019 | |

OTHER PUBLICATIONS

International Search Report and Written Opinion issued Oct. 28, 2021 in Intl. Appl. No. PCT/EP2021/067989.

* cited by examiner

*Primary Examiner* — Valentin Neacsu
*Assistant Examiner* — Felicia L. Brittman-Alabi
(74) *Attorney, Agent, or Firm* — MEDLER FERRO WOODHOUSE & MILLS PLLC

(57) ABSTRACT

A clamping device for fixing a wheelchair drive unit to a wheelchair frame, the clamping device comprising a lever, a first clamping jaw, a second clamping jaw, which are movably mounted on a clamping jaw holder via a jaw path between an open position and a closed position. The lever is movably coupled to the first clamping jaw and the second clamping jaw via a lever path such that a movement of the lever along the lever path causes the clamping jaws to move along the jaw path. A transmission arrangement couples the lever to the first clamping jaw and the second clamping jaw in such a way that, moving the lever by half the lever path causes the first clamping jaw and the second clamping jaw to move by more than half the jaw path in the direction of the closed position of the clamping jaws.

20 Claims, 6 Drawing Sheets

CLAMPING DEVICE

TECHNICAL FIELD

The present invention generally falls within the field of coupling devices for personal vehicles specially designed for use by the sick or disabled, such as wheelchairs and the like in particular. According to the preamble of claim 1, the invention relates to a clamping device for fixing a wheelchair drive unit to a wheelchair frame such that the wheelchair can be used in the form of a wheelchair bike.

BACKGROUND

Coupling and drive devices for wheelchairs are known in many forms, wherein it is possible to differentiate between drive devices that are permanently connected to the wheelchair and detachable drive devices. All detachable drive devices have in common that they are only connected to a wheelchair when required and otherwise the wheelchair is, for manual operation, substantially free of mostly bulky construction or drive elements, which are also correspondingly heavy.

WO 2017/081475 A1 discloses a drive device for a wheelchair in which the drive device engages a hook on a footrest of the wheelchair and two support arms are connected to frame tubes of the wheelchair in such a way that the drive device is attached to the wheelchair by means of gravity.

Document WO 2015/040507 A2 discloses a drive device for a wheelchair, which drive device has a handlebar and fork blades connected thereto, between which fork blades a drive wheel having a motor is arranged, which motor can be fed from an energy supply, wherein the drive device has a clamping device on a clamping bar, which clamping device can be clamped to a frame tube of the wheelchair. The present clamping device has two clamping segments that intermesh in a closed position via a detent on one clamping segment and a hook on the other clamping segment, wherein said clamping device is fixable in said closed position via a manually operable lever.

This known prior art combines the need for the drive units to be attached or installed on the wheelchair manually, for which a corresponding degree of dexterity and mobility is a basic requirement. Although these conventional drive units can be conveniently mounted on a wheelchair for relatively highly mobile people, the skill and mobility requirements for assembly and disassembly by a user of the wheelchair can exceed what he/she is actually able to accomplish. Consequently, such drive units cannot be used by the user independently, as a result of which his/her independence is restricted and an assistant for assembly or disassembly may be required.

In this regard, WO 2019/057799 A1 describes a drive device for a wheelchair having a control element, a chassis and a holding frame. Furthermore, a fixing device is mounted on the holding frame, which fixing device can be fixed on a wheelchair frame of the wheelchair. The fixing device is designed to be automatically connectable to and detachable from the wheelchair frame of the wheelchair via a fixing drive. This automatic fixing device allows independent and simple installation or removal of the drive device on a conventional wheelchair. However, this solution is associated with relatively high costs.

It is therefore the object of the present invention to propose a coupling device that equally allows independent and simple assembly or disassembly of a drive unit on a conventional wheelchair and that is also comparatively inexpensive to manufacture. In particular, the device should also make it possible for people with tetraplegia, for example, who may only have limited motor or sensory control, to be able to operate said device safely.

SUMMARY OF THE INVENTION

The object is achieved according to the invention by a clamping device as defined herein. Advantageous embodiment variants of the invention can be found in the dependent claims.

In one aspect, the invention is a clamping device for fixing a wheelchair drive unit to a wheelchair frame. The clamping device comprises a lever element, a first clamping jaw, a second clamping jaw and a clamping jaw holder. The first clamping jaw and the second clamping jaw are movably mounted on the clamping jaw holder via a jaw path between an open position and a closed position. The lever element is movably coupled to the first clamping jaw and the second clamping jaw via a lever path such that a movement of the lever element along the lever path causes the clamping jaws to move along the jaw path. The lever element is coupled to the first clamping jaw and the second clamping jaw via a transmission arrangement. The transmission arrangement couples the lever element to the first clamping jaw and the second clamping jaw in such a way that, starting from the open position of the clamping jaws, moving the lever element by half the lever path causes the first clamping jaw and the second clamping jaw to move by more than half the jaw path in the direction of the closed position of the clamping jaws.

In this case, it can be provided that both the first and the second clamping jaws are moved via the lever element or the transmission arrangement.

By means of the present invention, it can be ensured that the operator still has a disproportionately large amount of lever path available for the actual clamping process, i.e., clamping the clamping jaws to the wheelchair frame. As a result, firm coupling of the drive unit to the wheelchair frame can also be achieved with less effort and possibly with limited handling accuracy.

A further advantage is that the drive device does not have to be equipped with any additional components in order to connect the drive device to the wheelchair. Rather, the clamping device according to the invention acts directly on the wheelchair frame. In this way, the wheelchair can remain easy to handle and lightweight when the drive device is not connected thereto.

The "jaw path" that the first clamping jaw and the second clamping jaw travel from the open position to the closed position comprises the total path that both clamping jaws travel together. Each clamping jaw does not necessarily have to travel the same distance; it can also be the case that one clamping jaw travels about 30% of the total distance and the other clamping jaw about 70% of the total distance.

The "lever path" refers to the distance traveled by the lever element when it brings the clamping jaws from the open position to the closed position. The lever path traveled can also be read in particular from the position of the bolt in the hole guide of the eccentric arrangement because the rear end of the lever element is connected to said bolt. If the two clamping jaws are in their open position, then the lever element is in its initial position.

The "transmission arrangement" ensures optimized distribution of the force required to clamp the clamping device in such a way that, at the beginning of the closing process, a relatively large jaw path can be traveled with a relatively small lever path and a small amount of force and, at the end of the closing process, the last part of the jaw path can also be traveled with a relatively small amount of force and with a relatively large remaining lever path. The transmission arrangement can be designed in the form of an eccentric arrangement, for example, or in the form of a tightening screw having a progressive thread course, or another similar arrangement. The decisive factor here is that the transmission is designed in such a way that a relatively long lever path is available, in particular for the last path section of the clamping jaws, such that the final clamping process (i.e. reaching the closed position) can also be accomplished with little effort and possibly limited coordination. Conversely, this means that, at the beginning of the closing process, a disproportionately large jaw path is traveled with a relatively small lever path.

The “clamping jaw holder” generally comprises devices on which the clamping jaws are movably mounted. The clamping jaw holder can also comprise, at least in part, the transmission assembly.

The first and second clamping jaws have preferably traveled between 55% and 98%, preferably between 70% and 95% of the jaw path when the lever device has traveled half its lever path. In this way, optimal force distribution can be achieved during the closing process.

The transmission provided by the transmission arrangement preferably increases continuously from the open position to the closed position. As a result, particularly favorable tactile feedback can be provided for the user.

Preferably, the transmission arrangement is configured in the form of an eccentric arrangement. This design has proven to be particularly efficient in terms of construction.

The eccentric arrangement preferably has at least one hole guide in which a bolt is arranged that is operatively connected to the lever device. This ensures particularly reliable operation of the clamping device according to the invention.

The eccentric arrangement preferably also has an articulated piece that is connected to the first clamping jaw and the bolt and is operatively connected to the lever device via the bolt. In this way, in turn, an operative connection that is particularly simple in terms of design can be achieved.

Preferably, the second clamping jaw is mounted on a clamping jaw support and the lever device is connected in an articulated manner to the clamping jaw support. In this way, an optimized movement sequence for the second clamping jaw can be achieved.

The clamping jaw support preferably has a first hole bolt and the second clamping jaw has a second hole bolt, wherein the first hole bolt and the second hole bolt are connected to each other by means of a screw. This creates a particularly robust connection between the second clamping jaw and the clamping jaw support.

Preferably, the clamping jaw support is pivotally connected to the clamping jaw holder. This also allows the movement sequence for the second clamping jaw to be further improved.

A spring is preferably arranged between the first clamping jaw and the second clamping jaw. In particular, the opening process of the clamping jaws, i.e., from the closed position to the open position, can be decisively supported by means of the spring.

Preferably, the first and second clamping jaws in each case have a clamping recess that is configured to receive, for example, a frame element of a wheelchair frame in a clamping manner. As a result, particularly good adjustment to the wheelchair frame can be achieved.

The clamping recesses preferably in each case have a protective coating. This measure is intended to avoid unwanted scratches on the wheelchair frame. In addition, the protective coating can also ensure a better fit of the clamping device on the wheelchair frame.

Preferably, the second clamping jaw and the clamping jaw support are articulated at the clamping jaw holder via a common jaw pin. As a result, the movement sequence can be further optimized. The clamping jaw support and the second clamping jaw are preferably not movable relative to one another.

The first clamping jaw is preferably articulated at the clamping jaw holder via a (further) jaw pin. In this way, a sequence of movements that is advantageous for the first clamping jaw can be achieved.

Preferably, the lever device has a shape having two bends. This design has proven itself in terms of particularly simple and ergonomically advantageous handling.

The first clamping jaw and the second clamping jaw preferably form an enlarged insertion opening at their free end. This can facilitate coupling to the wheelchair frame.

Furthermore, the clamping jaw holder is preferably installed on a support element of a wheelchair drive unit. In this way, a particularly advantageous spatial arrangement of the individual components relative to one another can be provided.

In addition, the lever element can preferably be moved along the direction of movement H from the open position or its open position into the closed position or its closed position (i.e., toward the clamping jaws). In other words, the lever element is pushed in the direction of the clamping jaws for the purpose of closing the clamping jaws, which allows an ergonomically particularly favorable and particularly effective clamping movement.

In another aspect, the invention provides a wheelchair drive unit having a clamping device as described above. The effects and advantages described above in connection with the clamping device according to the invention and its preferred embodiments can be efficiently implemented with such a wheelchair drive unit.

BRIEF DESCRIPTION OF THE DRAWINGS

In the following, the invention is explained by way of example with reference to drawings. Identical objects are generally provided with identical reference signs in the drawings. At this point it is pointed out that the drawings do not have any restrictive effect on the subject matter of the invention, but merely represent possible embodiments of the inventive concept.

DETAILED DESCRIPTION

Figure 1:
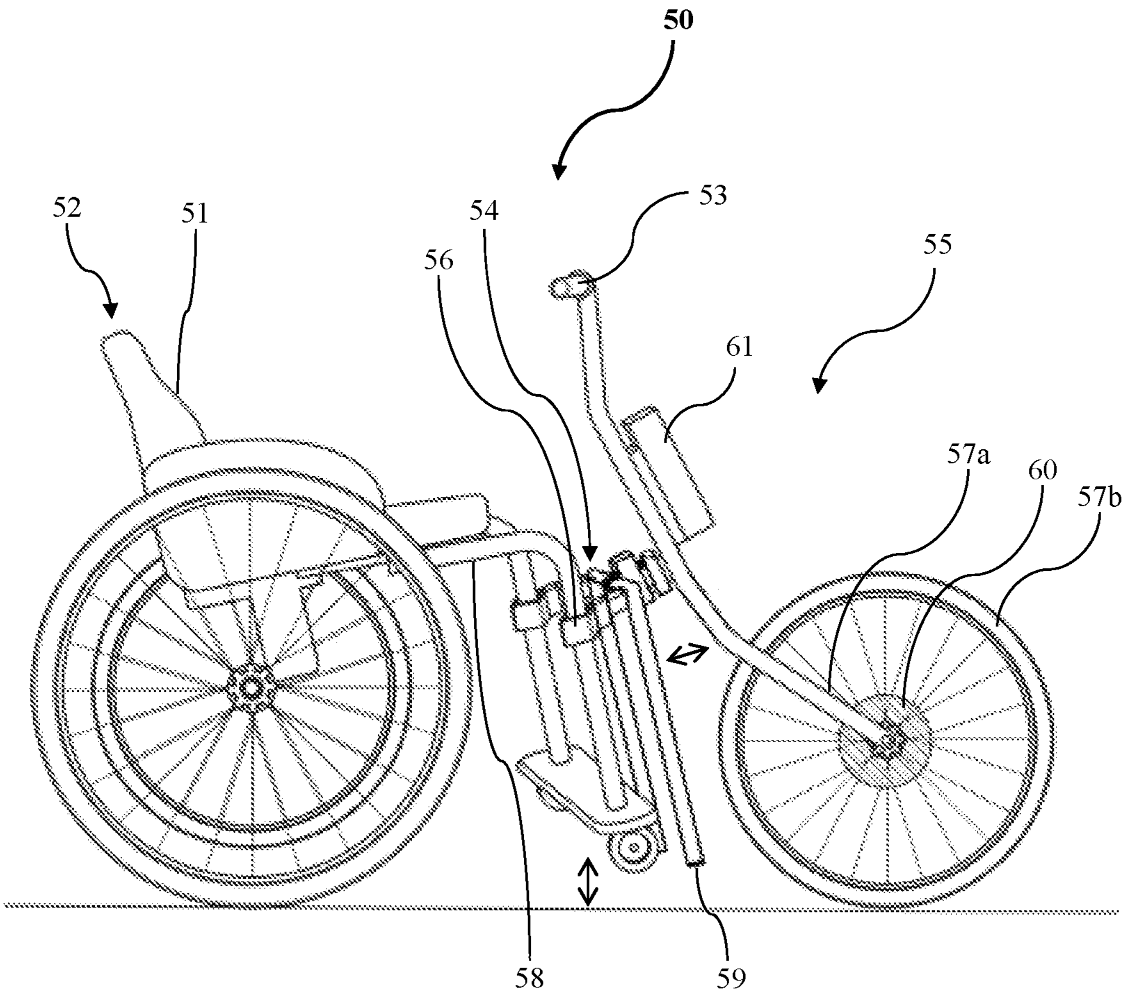
FIG. 1 is a side view of a wheelchair bike with an embodiment of a wheelchair drive unit according to the invention.

Certain terms are used in the following description for practical reasons and are not intended to be limiting. The words "right," "left," "below" and "above" indicate directions in the drawing to which reference is made. The terms "inward," "outward," "below," "above," "left," "right" or similar are used to describe the arrangement of designated parts relative to one another, the movement of designated parts relative to one another and the directions toward or away from the geometric center of the invention and designated parts thereof as shown in the drawings. This spatial relative information also comprises different positions and orientations from those shown in the drawings. For example, if a part shown in the drawings is reversed, elements or features that are described as "below" are then "above." The terminology includes the words expressly mentioned above, derivatives thereof, and words of similar meaning.

In order to avoid repetitions in the drawings and the associated description of the different aspects and embodiments, certain features are to be understood as common for different aspects and embodiments. The omission of an aspect in the description or a drawing does not suggest that this aspect is missing in the associated embodiment. Rather, such omission can serve for clarity and avoiding repetitions. In this context, the following specification applies to the entire further description: If reference signs are included in a drawing for the sake of clarity of the drawing, but are not mentioned in the directly associated description text, reference is made to the explanation thereof in the preceding descriptions of the drawings. If reference signs which are not contained in the associated drawing are also mentioned in the description text that belongs directly to a drawing, reference is made to the preceding and following drawings. Similar reference signs in two or more drawings represent similar or identical elements.

FIG. 1 shows a wheelchair 52 having a wheelchair bike 50 is shown in a side view for illustrative purposes. The wheelchair bike 50 comprises an embodiment of a wheelchair drive unit 55 according to the invention for the wheelchair 52 having a handlebar 53, a chassis 57*a*, 57*b* and a holding frame 59. A fixing device 54 in the form of a clamping device according to the invention is installed on the holding frame 59 and can be fixed on a wheelchair frame 58 of the wheelchair 52. The fixing device 54 is designed to be detachably installed on a wheelchair frame 58 of the wheelchair 52. In particular, the fixing device 54 has two pairs of clamping jaws 56 such that the fixing device 54 can be fastened to the wheelchair frame 58 on both sides. A seat 51 is stationarily installed on the wheelchair frame 58. The chassis comprises fork blades 57*a* of a fork connected to the handlebar 53 and a drive wheel 57*b* installed between the fork blades 57*a*. A drive motor 60 powered by a battery 61 as a power supply is arranged in the hub of the drive wheel 57*b*.

Figure 2:
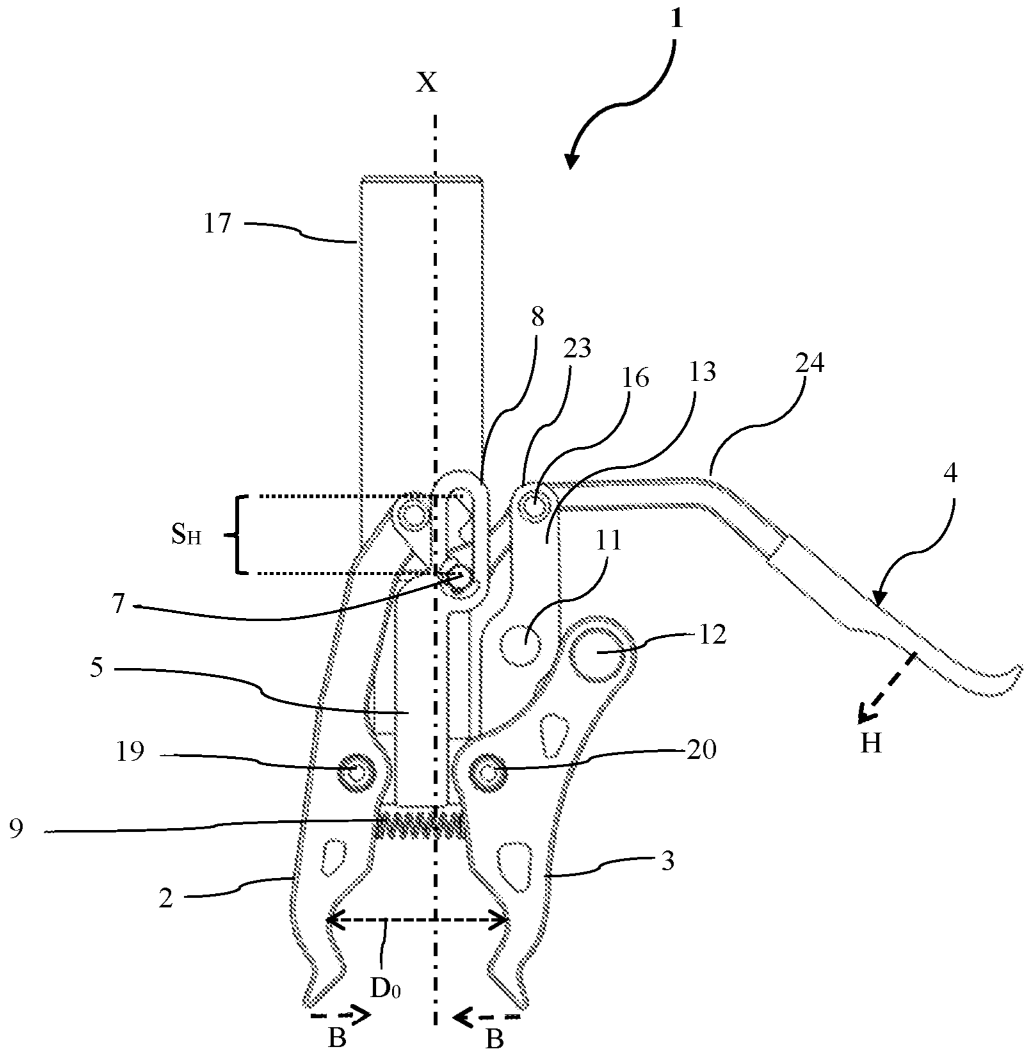
FIG. 2 is a bottom view of an embodiment of a clamping device according to the invention in the open position.

FIG. 2 is a bottom view of an embodiment of a clamping device 1 according to the invention in the open position. The clamping device 1 can be installed in the wheelchair drive unit 55 as the fixing device 54, for example.

The distance between the first clamping jaw 2 and the second clamping jaw 3 is greatest in the open position shown in FIG. 1 with $D_0$. The first clamping jaw 2 and the second clamping jaw 3 can be moved toward or away from each other by actuating the lever element 4. The direction of movement of the lever element 4 from the open position to the closed position is indicated by the dashed arrow H. The direction of movement of the two clamping jaws 2, 3 from the open position to the closed position (i.e., towards one another) is indicated by the dashed arrows B. The two clamping jaws 2, 3 are installed on a clamping jaw holder 5, wherein the first clamping jaw 2 is movably arranged on the clamping jaw holder via a jaw pin 19 and wherein the second clamping jaw 3 is movably arranged on the clamping jaw holder 5 via a jaw pin 20.

The second clamping jaw 3 is additionally connected to a clamping jaw support 13, wherein the second clamping jaw 3 has a holed pin 12 and the clamping jaw support 13 has a holed pin 11. The two holed pins 11 and 12 are connected to one another by means of a screw 14 (see FIG. 3), the screw 14 can be used to adjust or preset the clamping jaw 3 with regard to different frame sizes. The clamping jaw support 13 is also movably arranged on the clamping jaw holder 5 via the jaw pin 20. The jaw pins 19 and 20 are arranged in lateral parts of the clamping jaw holder 5. The clamping jaw support 13 and the second clamping jaw 3 are not movable relative to each other. A spring 9 is arranged between the two clamping jaws 2 and 3, which spring pushes the clamping jaws 2 and 3 apart.

The lever element 4 has a front bend 24 and a rear bend 23 for ergonomic reasons. In the region of the rear bend 23, the lever element 4 is articulated at the clamping jaw support 13 via a hinge pin 16. The rear end of the lever element 4 encloses a bolt 7 that is slidably guided in a slot or a hole guide 8 at the rear end of the clamping jaw holder 5. The rear end of the first clamping jaw 2 is connected to the bolt 7 via an articulated piece 6 such that when the lever element 4 is actuated, both the first clamping jaw 2 and the second clamping jaw 3 move.

In the bottom view shown, the bolt 7 is in the open position at the lower end of the slot or the hole guide 8. The support element 17 serves as a connecting piece to a wheelchair drive unit that is to be fastened to a wheelchair frame by means of the clamping device 1. X denotes the longitudinal axis of the clamping device 1 according to the invention.

Figure 3:
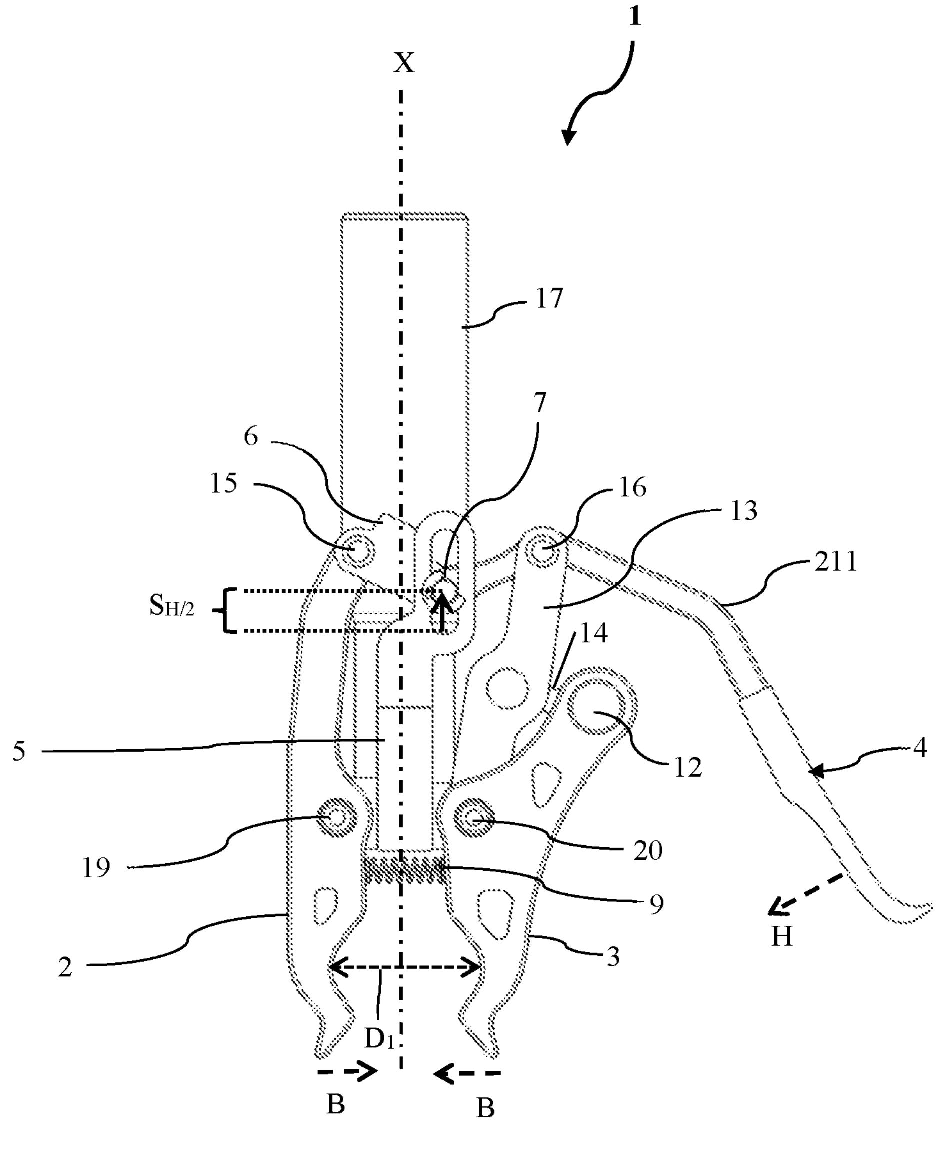
FIG. 3 shows the clamping device according to the invention according to FIG. 2 in an intermediate position with the lever having traveled approximately halfway.

In the intermediate position according to FIG. 3, the lever element 4 has been moved by approximately half of its lever path $S_{H/2}$ in the direction of the closed position. As can be seen, the bolt 7 has moved approximately to the center of the slot or the hole guide 8, which corresponds to half the lever path $S_{H/2}$. The movement of the bolt 7 is illustrated by the solid arrow. The distance between the first clamping jaw 2 and the second clamping jaw 3 has decreased from $D_0$ to $D_1$, wherein the clamping jaws 2, 3 have traveled more than halfway to the closed position. The spring 9 arranged between the clamping jaws 2 and 3 has been compressed accordingly.

Figure 4:
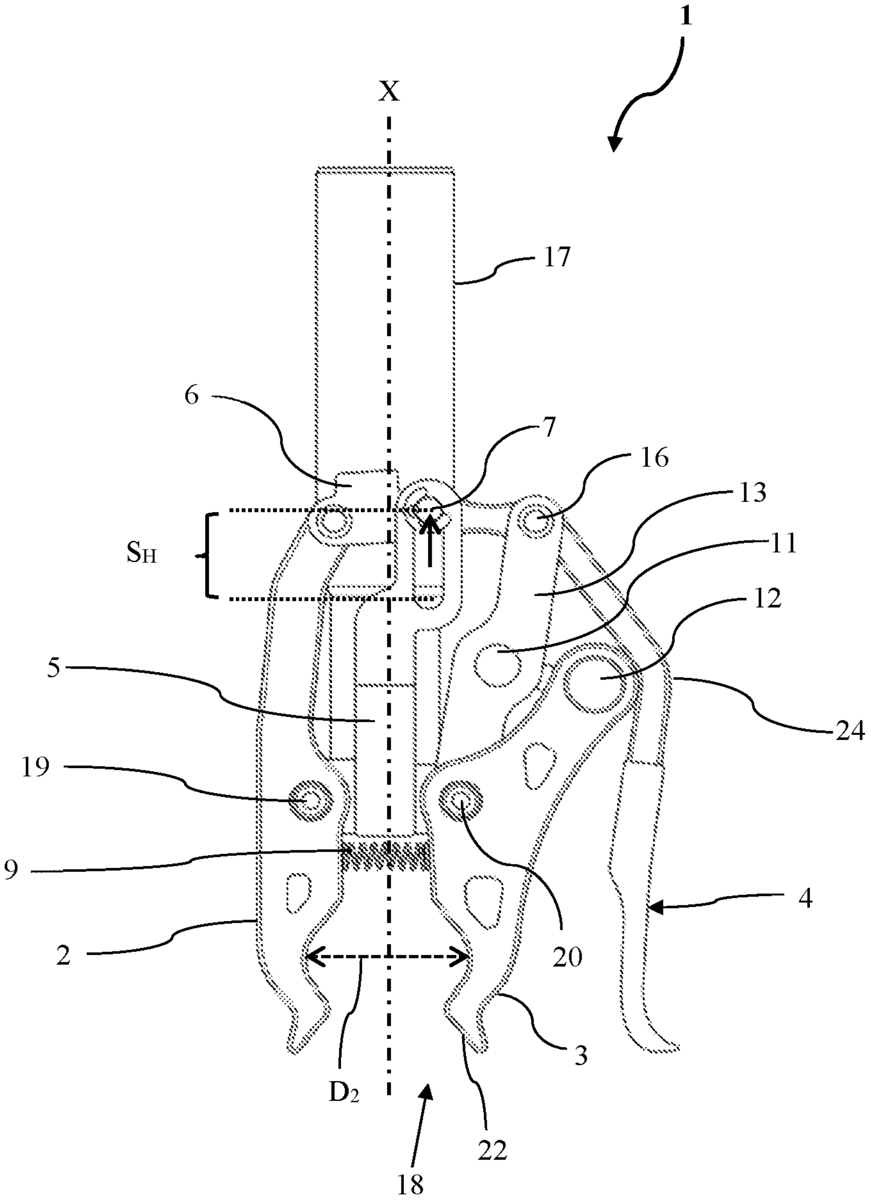
FIG. 4 the clamping device according to the invention according to FIG. 2 in the closed position.

FIG. 4 shows the closed position of the clamping device 1 according to the invention. The lever element 4 was correspondingly moved further by the remaining half of its lever path $S_{H/2}$. As can be seen, the bolt 7 has now moved to the upper end of the slot or the hole guide 8, which corresponds to the remaining half of the lever path. The movement of the bolt 7 is again illustrated by the solid arrow. The distance between the first clamping jaw 2 and the second clamping jaw 3 has now been reduced from $D_1$ to $D_2$, the clamping jaws 2, 3 having covered the full jaw path ($D_0$-$D_2$). The spring 9 has been further compressed accordingly. With regard to the intermediate position according to FIG. 3, the following generally applies: $D_0-D_1>(D_0-D_2)/2$.

The lever element 4 now rests with the inner side of the bend 24 on the upper end of the second clamping jaw 3 such that the free end of the lever element 4 runs substantially parallel to the longitudinal axis X of the clamping device 1 according to the invention. At their free ends, the first clamping jaw 2 and the second clamping jaw 3 each have a bevel 22, which bevels together form an insertion opening 18 for easier coupling to a wheelchair frame.

Figure 5:
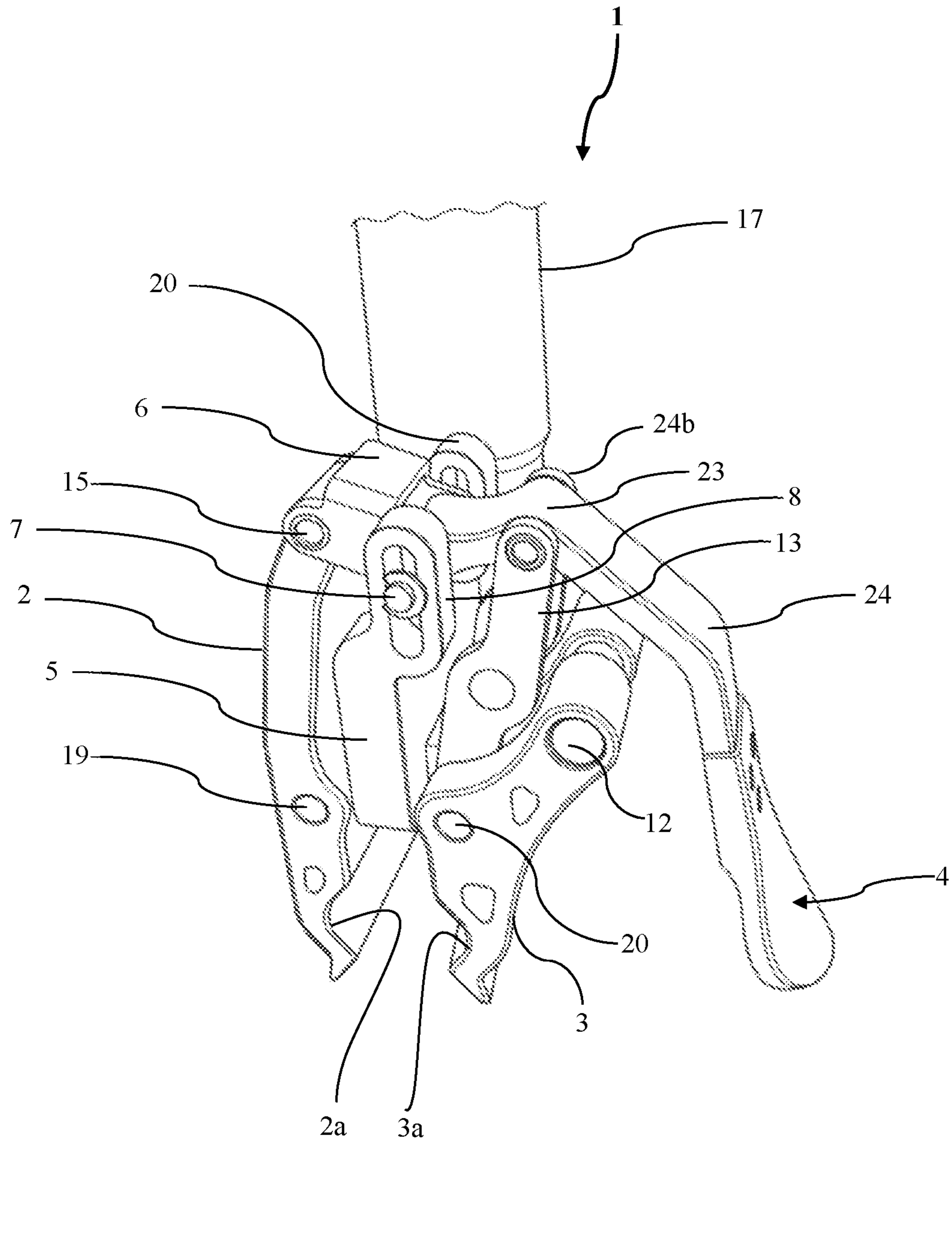
FIG. 5 is a perspective view of the clamping device according to the invention in the intermediate position according to FIG. 3.

The perspective view according to FIG. 5 illustrates the hole guide having the slots 8 on each side of the lever element 4 and the bolt 7 slidingly guided therein. The articulated piece 6 connected to the first clamping jaw 2 is articulated at the bolt 7 on each side of the lever element 4 and in each case between the two slots 8 and the lever element 4. When the lever element 4 moves, the articulated piece 6 and the bolt 7 in the hole guide having the two elongated holes 8 are also moved. The articulated piece 6 transmits its movement to the first clamping jaw 2. The rear end of the lever element 4 surrounding the bolt 7 transmits the movement thereof to the clamping jaw support 13 and via said clamping jaw support to the second clamping jaw 3. The clamping jaws 2 and 3 each have a clamping recess 2*a* and 3*a*, which clamping recesses ensure optimal adaptation to a wheelchair frame.

According to this embodiment, the transmission arrangement comprises the articulated piece 6, the bolt 7 and the hole guide having the slots 8, which couple the lever element 4 to the two clamping jaws 2 and 3 in an eccentric manner. The interaction of these components allows an optimized force progression, according to which more and more lever path is available from the open position to the closed position for decreasing jaw paths.

Figure 6:
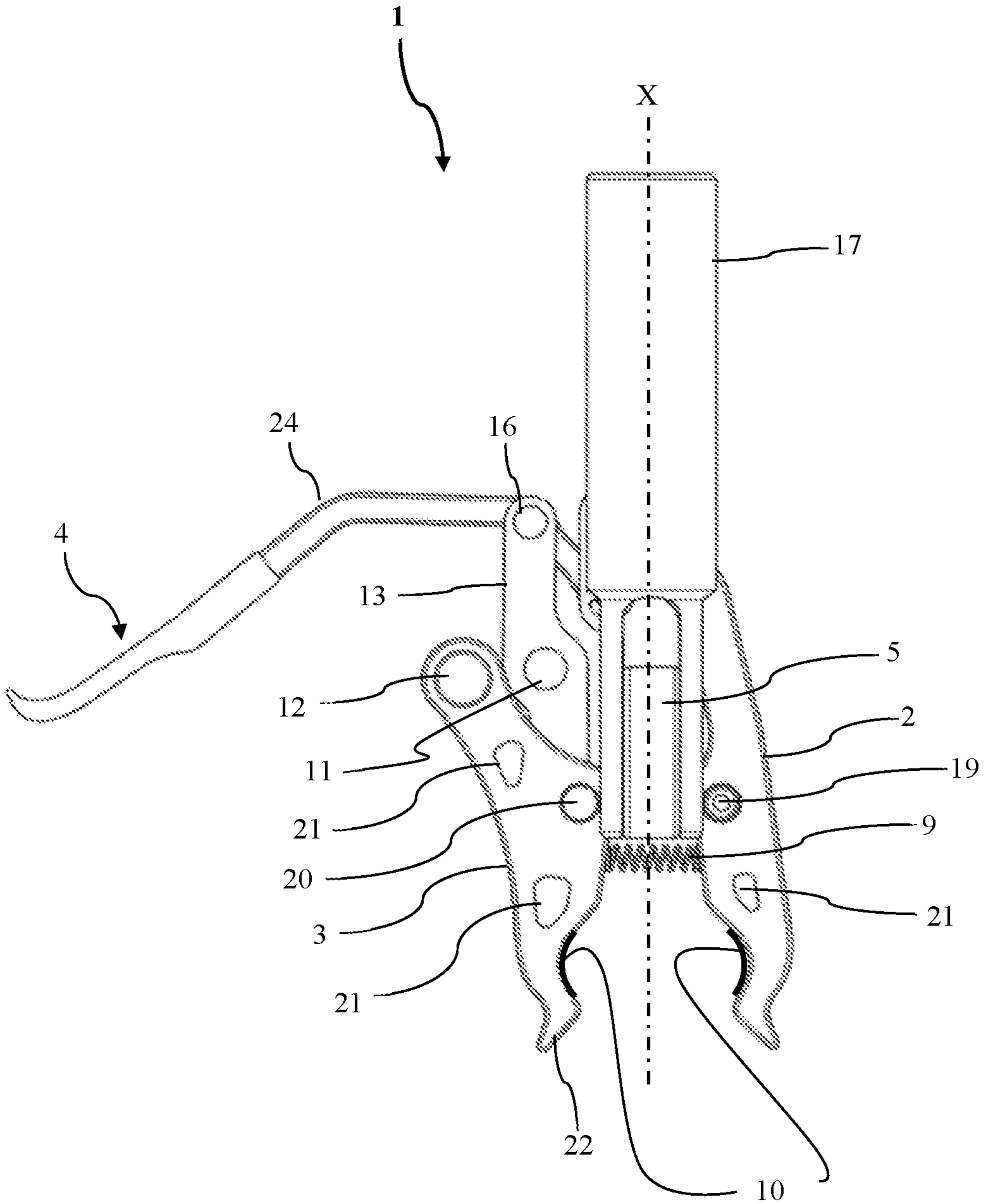
FIG. 6 is a plan view of the clamping device according to the invention in the open position according to FIG. 2.

FIG. 6 again shows a plan view of a clamping device 1 according to the invention having substantially the same components as in the previous figures. In addition, protective coatings 10 arranged in the clamping recesses can be seen here, which protective coatings prevent the wheelchair frame from being scratched and optionally ensure an optimized fit of the clamping jaws 2 and 3. For structural reasons, the first clamping jaw 2 and the second clamping jaw 3 each have one or more passage openings 21. The clamping jaw holder 5 can be immovably installed on the support element 17. However, the clamping jaw holder 5 is preferably installed such that it can be tilted in relation to the support element 17.

Although the invention is illustrated and described in detail by means of the drawings and the associated description, this illustration and this detailed description are to be understood as illustrative and exemplary and not as limiting the invention. In order not to transfigure the invention, in certain cases well-known structures and techniques cannot be shown and described in detail. It is understood that persons skilled in the art can make changes and modifications without departing from the scope of the following claims. In particular, the present invention covers further embodiments with any combination of features that may differ from the combinations of features explicitly described.

The present disclosure also includes embodiments with any combination of features mentioned or shown above or below for various embodiments. It also includes individual features in the drawings, even if they are shown there in connection with other features and/or are not mentioned above or below. The alternatives of embodiments and individual alternatives of the features thereof that are described in the drawings and the description can be excluded from the subject matter of the invention or from the disclosed subject matter. The disclosure includes embodiments that only comprise the features described in the claims or in the embodiments and also those that comprise additional different features.

Furthermore, the term "comprise" and derivatives thereof do not exclude other elements or steps. Likewise, the indefinite article "a" or "an" and derivatives thereof do not exclude a plurality. The functions of a plurality of features listed in the claims can be performed by a unit or a step. The terms "substantially," "about," "approximately," "quasi" and the like in connection with a property or a value in particular also define exactly the property or exactly the value. The terms "about" and "approximately" in connection with a given numerical value or range can refer to a value or range that lies within 20%, within 10%, within 5% or within 2% of the given value or range.

LIST OF REFERENCE SIGNS

1 clamping device
2 first clamping jaw
2*a* clamping recess
3 second clamping jaw
3*a* clamping recess
4 lever element
5 clamping jaw holder
6 articulated piece
7 bolt
8 hole guide or slot
9 spring
10 protective coating
11 first hole bolt
12 second hole bolt
13 clamping jaw support
14 screw
15 hinge pin
16 hinge pin
17 support element
18 insertion opening
19 jaw pin
20 jaw pin
21 passage openings
22 bevels
23 bend
24 bend
50 wheelchair bike
51 seat
52 wheelchair
53 handlebar
54 fixing device
55 wheelchair drive unit
56 clamping jaws
57*a* fork blades
57*b* drive wheel
58 wheelchair frame
59 holding frame
60 drive motor
61 battery
B direction of movement of the jaws
$D_0$ distance of the jaws in the open position
$D_1$ distance of the jaws at $S_{H/2}$
$D_2$ distance of the jaws in the closed position
H direction of movement of the lever
$S_H$ lever path
X longitudinal axis

What is claimed is:

1. A clamping device for fixing a wheelchair drive unit to a wheelchair frame comprising:
a lever element;
a first clamping jaw;
a second clamping jaw;
a clamping jaw holder; and
a transmission arrangement, wherein
the first clamping jaw and the second clamping jaw are movably mounted on the clamping jaw holder via a jaw path between an open position and a closed position, the lever element is movably coupled to the first clamping jaw and the second clamping jaw via a lever path such that a movement of the lever element along the lever path causes the clamping jaws to move along the jaw path, the transmission arrangement couples the lever element to the first clamping jaw and the second clamping jaw in such a way that, starting from the open position of the clamping jaws, moving the lever element by half the lever path causes the first clamping jaw and the second clamping jaw to move by more than half the jaw path in the direction of the closed position of the clamping jaws, the transmission arrangement is configured in the form of an eccentric arrangement, the eccentric arrangement has at least one hole guide in which a bolt is arranged that is operatively connected to the lever device, and the eccentric arrangement also has an articulated piece that is connected to the first clamping jaw and the bolt and is operatively connected to the lever device via the bolt.

2. The clamping device according to claim 1, wherein the transmission arrangement is designed in such a way that, starting from the open position of the clamping jaws, the clamping jaws travel between approximately 55% and 98% of the jaw path when the lever device travels half of the lever path.

3. The clamping device according to claim 1, wherein the transmission provided by the transmission arrangement increases continuously from the open position to the closed position.

4. The clamping device according to claim 1, wherein the second clamping jaw is installed on a clamping jaw support and wherein the lever device is connected in an articulated manner to the clamping jaw support.

5. The clamping device according to claim 4, wherein the clamping jaw support has a first hole bolt and the second clamping jaw has a second hole bolt, wherein the first hole bolt and the second hole bolt are connected to each other by means of a screw.

6. The clamping device according to claim 4, wherein the clamping jaw support is connected in an articulated manner to the clamping jaw holder.

7. The clamping device according to claim 4, wherein the clamping jaw holder is installed on a support element for the wheelchair drive unit.

8. The clamping device according to claim 1, wherein a spring is arranged between the first clamping jaw and the second clamping jaw.

9. The clamping device according to claim 1, wherein the clamping jaws in each case have a clamping recess that is configured to receive a frame element of a wheelchair frame in a clamping manner.

10. The clamping device according to claim 9, wherein the clamping recesses in each case have a protective coating.

11. The clamping device according to claim 1, wherein the second clamping jaw and the clamping jaw support are articulated at the clamping jaw holder via a common jaw pin.

12. The clamping device according to claim 1, wherein the first clamping jaw is articulated at the clamping jaw holder via a jaw pin.

13. The clamping device according to claim 1, wherein the lever device has a shape having two bends.

14. The clamping device according to claim 1, wherein the first clamping jaw and the second clamping jaw form an enlarged insertion opening at their free end.

15. The clamping device according to claim 1, wherein the lever element is movable along the direction of movement from the open position to the closed position.

16. A wheelchair drive unit having a clamping device according to claim 1.

17. A clamping device for fixing a wheelchair drive unit to a wheelchair frame comprising:

a lever element;

a first clamping jaw;

a second clamping jaw;

a clamping jaw holder; and a transmission arrangement, wherein the first clamping jaw and the second clamping jaw are movably mounted on the clamping jaw holder via a jaw path between an open position and a closed position, the lever element is movably coupled to the first clamping jaw and the second clamping jaw via a lever path such that a movement of the lever element along the lever path causes the clamping jaws to move along the jaw path, the transmission arrangement couples the lever element to the first clamping jaw and the second clamping jaw in such a way that, starting from the open position of the clamping jaws, moving the lever element by half the lever path causes the first clamping jaw and the second clamping jaw to move by more than half the jaw path in the direction of the closed position of the clamping jaws, and the second clamping jaw and a clamping jaw support are articulated at the clamping jaw holder via a common jaw pin.

18. The clamping device according to claim 17, wherein the second clamping jaw is installed on the clamping jaw support and wherein the lever device is connected in an articulated manner to the clamping jaw support.

19. The clamping device according to claim 17, wherein the clamping jaw support is connected in an articulated manner to the clamping jaw holder.

20. A clamping device for fixing a wheelchair drive unit to a wheelchair frame comprising:

a lever element;

a first clamping jaw;

a second clamping jaw;

a clamping jaw holder; and a transmission arrangement, wherein the first clamping jaw and the second clamping jaw are movably mounted on the clamping jaw holder via a jaw path between an open position and a closed position, the lever element is movably coupled to the first clamping jaw and the second clamping jaw via a lever path such that a movement of the lever element along the lever path causes the clamping jaws to move along the jaw path, the transmission arrangement couples the lever element to the first clamping jaw and the second clamping jaw in such a way that, starting from the open position of the clamping jaws, moving the lever element by half the lever path causes the first clamping jaw and the second clamping jaw to move by more than half the jaw path in the direction of the closed position of the clamping jaws, the second clamping jaw is installed on a clamping jaw support and wherein the lever device is connected in an articulated manner to the clamping jaw support, the clamping jaw support has a first hole bolt and the second clamping jaw has a second hole bolt, and the first hole bolt and the second hole bolt are connected to each other by means of a screw.

* * * * *